Nov. 3, 1964 D. W. BOENSEL 3,155,963

TRANSISTORIZED SWITCHING CIRCUIT

Filed May 31, 1960 2 Sheets-Sheet 1

DONALD W. BOENSEL
INVENTOR.

BY Allen E. Botney

ATTORNEY

Nov. 3, 1964 D. W. BOENSEL 3,155,963

TRANSISTORIZED SWITCHING CIRCUIT

Filed May 31, 1960 2 Sheets-Sheet 2

DONALD W. BOENSEL
INVENTOR.

BY Allen E. Botney

ATTORNEY

United States Patent Office 3,155,963
Patented Nov. 3, 1964

3,155,963
TRANSISTORIZED SWITCHING CIRCUIT
Donald W. Boensel, La Crescenta, Calif., assignor, by mesne assignments, to Space-General Corporation, Glendale, Calif., a corporation of California
Filed May 31, 1960, Ser. No. 32,729
14 Claims. (Cl. 340—347)

The present invention relates in general to switching circuits and more particularly relates to a transistorized switch arrangement which is inherently accurate irrespective of circuit parameter variations.

It is often desirable to provide a switch by means of which either one of two voltage levels may selectively be applied to the switch output. Switches of this sort are particularly useful in digital-to-analog converters which, as its name implies, converts digital information to analog form. In all instances where accuracy is required, especially in the instance mentioned, it is essential that the switching circuits be as stable and free of drift as possible. Otherwise, it will be recognized, the accuracy of the outputs attained by these devices will be impaired.

With respect to the prior art in this area, mechanical switches with precious metal contacts have been employed in commercial instruments, such as digital voltmeters. These switches, however, which are in the form of either relays or stepping switches, exhibit a number of disadvantages, the most important of which are limited speed, contact bounce, as well as high weight and power requirements.

A number of systems have used both vacuum and semi-conductor diodes as well as transistors in bridge configurations identical to those used for analog commutation purposes. The disadvantages of these arrangements include:

(*a*) Extremely critical regulation of relatively high D.-C. control voltages is normally required because any drift in these biases is directly reflected as an output error. For example, regulation of nominally 100 volts to less than 5 millivolts is commonplace.

(*b*) Matching of diode or transistor characteristics at several temperatures, together with tedious resistive padding, is usually required for wide temperature environment stabilities down to less than a couple of millivolts.

Still other disadvantages are associated with such bridge arrangements.

It is, therefore, an object of the present invention to provide a transistorized switching circuit that exhibits excellent output characteristics.

It is another object of the present invention to provide a transistorized switching circuit that is drift-free irrespective of circuit parameter variations.

It is a further object of the present invention to provide a transistorized switching circuit having a degree of stability previously attainable only through the selection and pre-matching of components.

It is an additional object of the present invention to provide a transistorized switching circuit that switches in such a way as to maintain a constant output resistance as seen by a load.

The present invention either eliminates or very substantially avoids the above and other disadvantages associated with the switch implementations mentioned. Embodiments of the invention use two complementary symmetry transistors (either fully saturated or non-conducting) as the switch elements. By appropriate biasing, either one or the other of the two transistors is saturated (ON) regardless of the digital input state. This mode of operation assures that the point in the circuit that is common to these transistors is always incrementally connected to ground, thereby providing a constant source resistance for the load. Moreover, the use of a complementary transistor switch configuration practically eliminates the effect of transistor leakage current, since such an arrangement, in either state, is confronted by a low resistance circulation path in parallel with the output resistance network. As a result, relatively high leakage current germanium transistors may be used with no compromise in performance.

Furthermore, the present invention is capable of providing a stability and reliability equivalent to that of matched prior art networks with no selection of transistors required for no less than 1 millivolt stability over a nominal 70° C. temperature range. Since networks according to the invention are designed in such a way as to be either independent of or only differentially affected by temperature dependent transistor characteristics, they may therefore be produced with inexpensive and readily available semi-conductor components. Thus, unlike previous networks, subject networks do not require silicon transistors but, in fact, operate more satisfactorily with germanium devices in applications requiring a maximum ambient temperature of less than 70° to 80° centigrade. This covers most laboratory as well as most missile and spacecraft environments.

Finally, because of its predictable characteristics, network embodiments of the invention can be readily adapted to large scale fabrication efforts, which is an attractive commercial property.

The novel features which are believed to be characteristic of the invention, both as to its organization and method of operation, together with further objects and advantages thereof will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figures 1, 2:
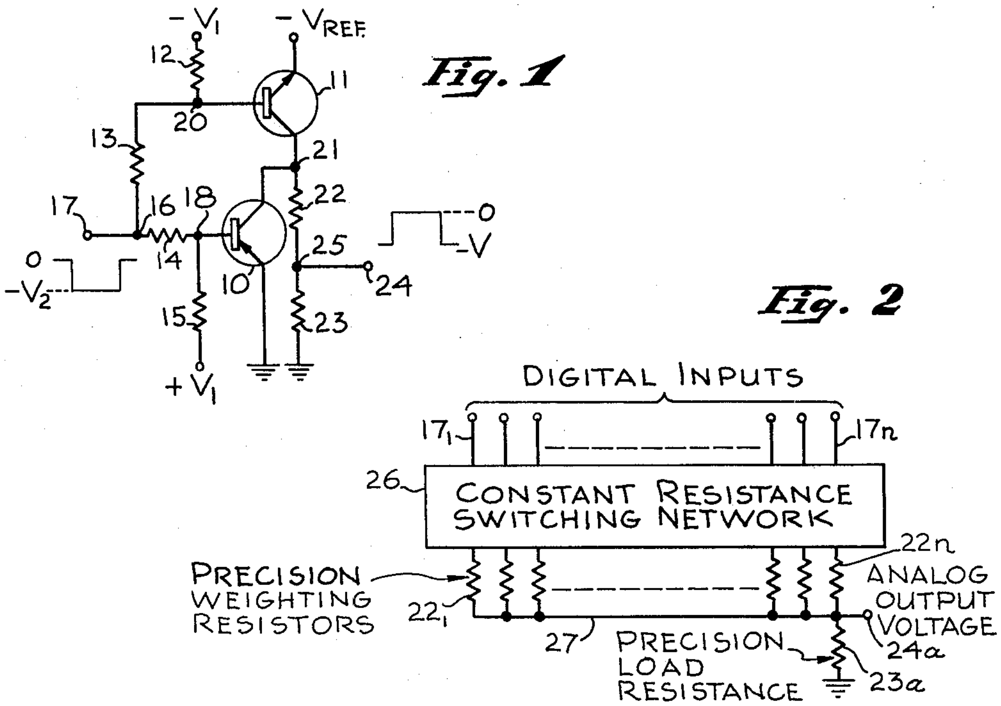
FIG. 1 is a circuit diagram of an embodiment of the invention adapted for digital inputs of one polarity.
FIG. 2 is a diagram, partly in block form and partly in schematic form, used herein to explain the principles of those digital-to-analog converters in which the embodiment of FIG. 1 may be utilized.

For a consideration of the invention in detail, reference is now made to the drawings wherein like or similar parts or elements are given like or similar designations. In FIG. 1, the embodiment is shown to include a pair of transistors 10 and 11 connected in series between an accurately regulated voltage source $-V_{REF.}$ and ground. More specifically, transistor 10 is a PNP type of transistor whose emitter element is connected to ground and whose collector element is connected directly to the collector element of transistor 11 which is of the NPN type. The emitter element of transistor 11 is connected directly to voltage source $-V_{REF}$. The circuit of FIG. 1 further includes a voltage-divider arrangement which is preferably made up of four resistors 12, 13, 14 and 15 connected in series between a voltage source $+V_1$ at one end and a voltage source $-V_1$ at the other end. In particular, resistor 12 is connected to voltage source $-V_1$ and resistor 15 is connected to voltage source $+V_1$, resistors 13 and 14 being connected in series between resistors 12 and 15 with the junction of resistors 13 and 14, designated 16, being connected to an input terminal 17. Furthermore, the junction of resistors 14 and 15, designated 18, is connected to the base element of transistor 10 and the junction of resistors 12 and 13, designated 20, is connected to the base element of transistor 11. Finally, the embodiment shown includes an output load resistance connected between ground and the common junction of the transistor collector elements, this junction being designated 21. This output load resistance may include one or more resistors but in order to provide the basis for a clearer description later of other features of the invention, the circuit is shown to include a pair of series-connected resistors, namely, resistors 22 and 23. The circuit output is developed at an output terminal 24 which is connected to resistors 22 and 23 at their junction point which is designated 25.

In considering the operation, it should first be mentioned that the values of resistance of voltage-divider resistors 12 to 15 are so selected that transistor 10 is initially biased to a non-conducting state and transistor 11 is initially biased to a conducting state. As a result, for all practical purposes, transistor 10 is an open circuit element and transistor 11 is a closed or shorted circuit element. Accordingly, the initial and normal situation is that resistors 22 and 23 are connected at one end to ground and through the extremely low impedance of transistor 11 to voltage source $-V_{REF.}$ at the other end. Consequently, the voltage $E_0$ normally developed at output terminal 24 is equal to the value of $-V_{REF.}$ multiplied by the fraction $$\frac{R_{23}}{R_{22}+R_{23}}$$

where $R_{22}$ and $R_{23}$ are the respective resistance values of resistors 22 and 23. Furthermore, due to the fact that the internal impedance of voltage source $-V_{REF.}$ is extremely low, zero for all practical purposes, it will be recognized by those skilled in the art that the impedance seen from output terminal 24 looking back into the circuit is that of resistors 22 and 23 connected in parallel, that is, the circuit impedance $R_0$ is equal to $$\frac{R_{22}\times R_{23}}{R_{22}+R_{23}}$$

When a negative pulse is applied to input terminal 17, such as the pulse shown in FIG. 1 which varies between 0 and $-V_2$ voltage levels, junction point 16 is lowered from its previous voltage level to that of $-V_2$. This has the effect of also lowering the voltage levels at junction points 18 and 20 and, therefore, of lowering the voltages applied to the respective base elements of transistors 10 and 11. When this occurs, the states of the transistors are reversed, that is to say, transistor 10 is rendered conducting and transistor 11 is rendered non-conducting, which means that resistors 22 and 23 are now connected through transistor 10 back to ground. It will be obvious that since the internal impedance of transistor 10 is also extremely low in its conducting state, resistors 22 and 23 are once again connected in parallel so that the impedance seen from output terminal 24 looking back into the circuit remains the same, that is, irrespective of the states of the transistors, a constant value of impedance is seen by the output terminal, in this case a resistive impedance. Following the occurrence of the applied pulse, transistors 10 and 11 return to their initial states in which transistor 10 is non-conducting and transistor 11 is conducting. As may be expected, the back impedance of the circuit again remains unchanged.

Summarizing, the circuit arrangement of FIG. 1 uses two complementary symmetry transistors as switches (either fully saturated or non-conducting). The circuit is biased in such a manner that either one or the other of transistors 10 and 11 is saturated (ON) regardless of the digital input state. This mode of operation assures that junction point 21 is always incrementally connected to ground, thereby providing a constant source resistance for the load. Specifically, when the digital input is at $-V_2$, transistor 11 is OFF, transistor 10 is ON, and junction point 21 is at ground, that is, at 0; for the digital input at 0, transistor 11 is ON, transistor 10 is OFF, and junction point 21 is at $-V_{REF.}$ It will be recognized that no high voltages are needed for this circuit. Moreover, the only voltage requiring any regulation is that used as a reference, namely, $-V_{REF.}$, since the other voltages involved produce only negligible second-order effects once switching conditions are assured by proper control biases. An extremely important additional property flows from the fixed incremental resistance mode of operation of the present invention. More particularly, minority carrier leakage current in either transistor (this can be represented by a temperature dependent current source shunted between the collector and emitter of each device) has no effect on output voltage since this current, in either circuit state, is confronted by a low resistance circulation path in parallel with the output load resistance. As a result, relatively high leakage current germanium transistors may be used with no compromise in circuit performance.

From what has been said above, it can be seen why the circuit of FIG. 1 is independent of the non-ideal properties generally exhibited by transistor switches. As an example of the very greatly improved behavior that may be expected from the present switching circuit, a circuit using two general purpose transistors was constructed. The results are tabulated below:

| Digital Input Signal | Output Voltage (Volts) | |
|---|---|---|
| | T=25° C. | T=100° C. |
| 0 Volts | −4.873 | −4.875 |
| −6 Volts | −0.003 | −0.002 |

In addition, variations of ±10% in the control voltages produced no detectable change in output voltage for either digital input condition. These results certainly indicate the feasibility of obtaining better than 2 millivolt stability over a 75° C. temperature range without component selection or matching being required.

A number of circuits of the type shown in FIG. 1 and described above may be combined to form a digital-to-analog converter of the kind illustrated in FIG. 2. As shown therein, the converter basically comprises a plurality of input terminals $17_1$–$17_n$, a corresponding plurality of precision weighting resistors $22_1$–$22_n$, a constant resistance switching network 26 for selectively connecting the weighting resistors either to ground or to a reference voltage source (not shown), a precision output load resistor 23*a* connected to weighting resistors $22_1$–$22_n$ by means of a common buss bar or lead 27, and an output terminal 24*a* connected to the lead 27.

The digital-to-analog converter of FIG. 2 is of the type that operates on digital quantities in parallel, that is to say, it accepts one or more input digits simultaneously. More specifically, when one or more pulses or digits are respectively applied to one or more terminals, the associated weighting resistors are immediately switched to a different voltage level, that is, from one source of voltage to another. The voltage changes or drops thusly experienced by these weighting resistors are averaged according to the number of such weighting resistors involved and their values of resistance, the resultant voltage, which is the desired analog voltage, being produced across load resistor 23*a* and, therefore, between output terminal 24*a* and ground. Succeeding pulse combinations appropriately applied to input terminals $17_1$–$17_n$ similarly produce analog output voltages so that the signal developed at output terminal 24a is a continuous analog representation of the pulse groups sequentially applied to the converter. This signal may, of course, be subsequently smoothed.

It will surely be recognized by anyone skilled in the electronic arts that the analog equivalent will vary and, therefore, be inaccurate if, for one reason or another, the impedance of network 26 in FIG. 2 is allowed to vary or drift. Stated differently, for precise digital-to-analog conversion, it is necessary that the source impedance of the output voltage remain constant for all configurations of the converter. Thus, the impedance seen in looking back into the converter from output terminal 24a must, as nearly as possible, be a constant irrespective of ambient temperature variations, irrespective of the aging of parts with the passage of time, and irrespective of the number of switches in the switching network entering into an operation at any one time. Consequently, the key to obtaining a linear, drift-free analog output representation of digital inputs lies in obtaining drift-free conversion switches and switching in such a way as to maintain constant the output resistance of the switch matrix as seen by the load.

Figure 3:
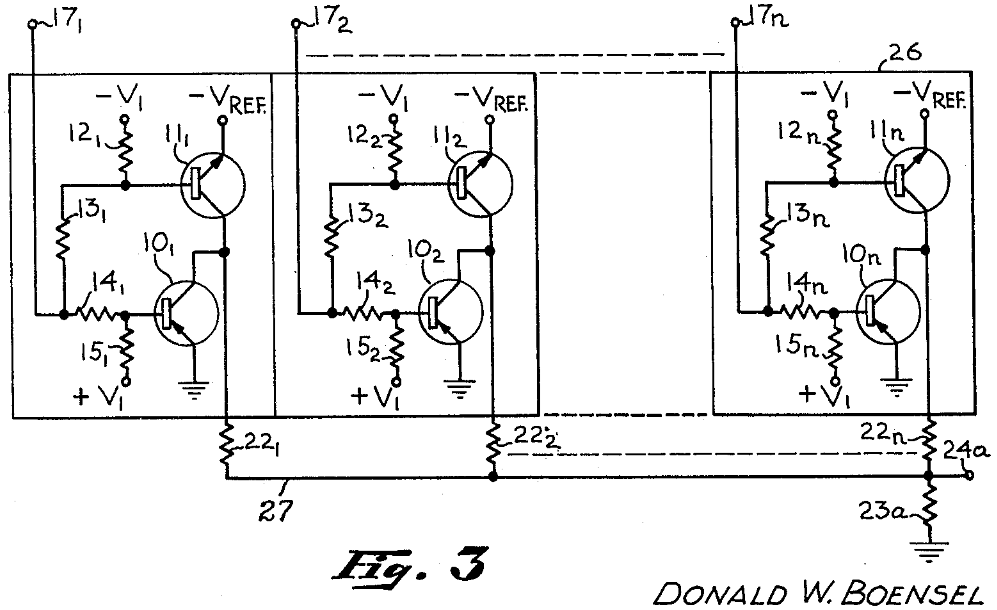
FIG. 3 is a schematic representation of the converter of FIG. 2 illustrating how the circuit of FIG. 1 may be incorporated therein.

The switching circuit of FIG. 1 is admirably suited to meet the above-stated requirements and the manner in which a plurality of such circuits may be combined to form a constant resistance switching network for a digital-to-analog converter is shown in FIG. 3. The construction and operation of such circuit was previously described in detail and, hence, need not be described again here. Suffice it to say, therefore, that in the absence of any pulses at input terminals $17_1$–$17_n$, precision weighting resistors $22_1$–$22_n$ are respectively coupled through transistors $11_1$–$11_n$ to regulated reference voltage source $-V_{REF}$. As was previously mentioned, the internal impedances of both the transistors and voltage source $-V_{REF.}$ are extremely low so that, insofar as impedance considerations are concerned, the weighting resistors are effectively coupled to ground. Accordingly, it may be said that the source impedance looking back into the converter from output terminal 24a is that of weighting resistors $22_1$–$22_n$ in parallel with load resistor 23a.

On the other hand, when pulses are applied to input terminals $17_1$–$17_n$, a switching action as heretofore described occurs in each of those circuits receiving a pulse, with the result that the weighting resistors affected are coupled to ground through transistors 10 rather than through transistors 11. Here too, however, all the weighting resistors are shunted across load resistor 23a so that, notwithstanding the switching action, the source impedance is the same as it was before. For example, if pulses are simultaneously received at input terminals $17_1$, $17_2$ and $17_n$, then weighting resistors $22_1$, $22_2$ and $22_n$ are respectively coupled to ground through transistors $10_1$, $10_2$ and $10_n$ instead of through transistors $11_1$, $11_2$ and $11_n$. However, since resistors $22_1$–$22_n$ are at all times coupled to ground, whether it be through transistors 10 or 11, and are therefore at all times in shunt with resistor 23a, it will be obvious that the source impedance remains a constant. This helps provide an accurate output. Furthermore, in view of the fact that the switching circuits used herein are inherently insensitive to factors which may introduce errors, such as temperature fluctuations, aging, minority carrier leakage, etc., as explained above, it will be obvious that the present invention makes it possible to realize stable conversion with unselected components and over a wide temperature range. Of course, if selected components were used throughout, then extremely excellent output stability would be achieved.

Figure 4:
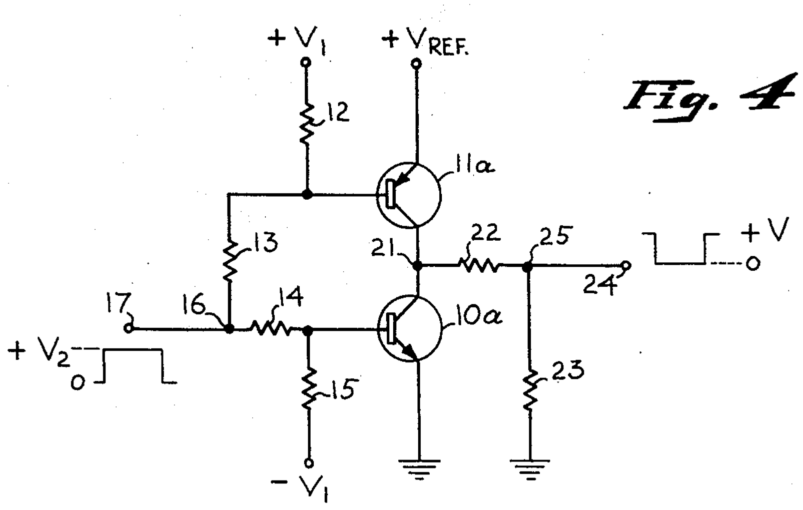
FIG. 4 is the embodiment of FIG. 1 adapted for digital inputs of reverse polarity.

The circuits of FIGS. 1 and 3 were designed to accommodate negative pulses. It should be noted, therefore, that by slight modifications these circuits may be adapted to accommodate positive pulses as well. This can be done by respectively substituting NPN and PNP transistors for PNP and NPN transistors 10 and 11, and by reversing the polarities of the various voltage sources used, that is, by substituting positive voltage sources for those in the circuits that are negative and vice versa. A switching circuit adapted in the manner indicated to accommodate positive pulses is shown in FIG. 4. Furthermore, like the circuit of FIG. 1, a number of circuits of the type shown in FIG. 4 may be combined in the same manner that the FIG. 1 circuits were combined to also form a digital-to-analog converter of the kind shown in FIG. 3.

Figure 5:
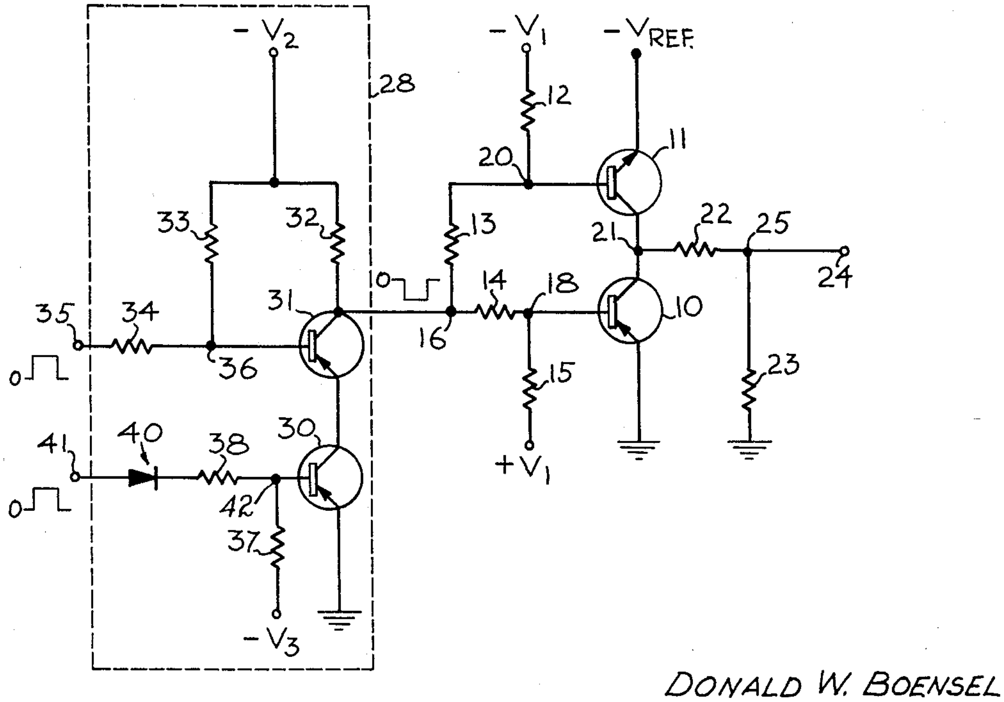
FIG. 5 is a schematic circuit of the FIG. 1 embodiment showing how it may be modified to fulfill further needs.

Irrespective of whether the circuits of FIGS. 1 and 4 are used by themselves or in combination with other such circuits in a converter, the need may arise to suddenly clamp their outputs to ground. In FIGS. 1 and 4, this would mean clamping junction points 21 to ground. This need may be satisfied by adding an inhibit type circuit to either of the circuits of FIGS. 1 and 3 to form still another novel arrangement. For purposes of illustration and description, the circuit of FIG. 1 has been selected and for this purpose is shown again in FIG. 5 to which reference is now made.

The inhibit type circuit added to the basic switching circuit is designated 28 and is shown to include a pair of PNP transistors 30 and 31 connected in a forward direction, that is, the collector of transistor 30 is connected to the emitter of transistor 31. On the other hand, the emitter of transisor 30 is connected to ground and the collector of transistor 31 is coupled through a resistor 32 to a negative source of voltage $-V_2$. Voltage source $-V_2$ is also coupled through a series-connected pair of resistors 33 and 34 to an input terminal 35, the junction of resistors 33 and 34, designated 36, being connected to the base element of transistor 31. Circuit 28 further includes another pair of series-connected resistors 37 and 38 connected between another negative voltage source $-V_3$ and the cathode terminal of a diode which is generally designated 40. The anode terminal of diode 40 is connected directly to another input terminal 41 and, similarly, the junction of resistors 37 and 38, designated 42, is connected directly to the base element of transistor 30.

In operation, it will be assumed that the resistances of resistors 32, 33, 34, 37 and 38 as well as the voltages of voltage sources $-V_2$ and $-V_3$ have so been selected that in the absence of any signals at input terminals 35 and 41, transistors 30 and 31 are in an ON or conducting state. Consequently, the collector of transistor 31 and, therefore, junction 16 in the switching circuit, is substantially clamped to ground through these transistors. Stated differently, under these initial conditions, the input to the switching circuit is at ground potential. It will be remembered from the previously presented description of the switching circuit that under such circumstances, transistor 10 is cut-off, transistor 11 is conducting and junction 21 is at $-V_{REF}$.

When a positive pulse is applied to input terminal 35, transistor 31 is rendered non-conducting so that the input to the switching circuit, that is, junction point 16, is no longer clamped to ground. Rather, junction 16 is now at a negative voltage level intermediate $-V_1$ and $-V_2$ and this is sufficient, as before, to switch transistor 10 to an ON state and transistor 11 to an OFF state. When this occurs, junction 21 is clamped to ground, as may be expected.

Now, irrespective of whether a pulse is or is not applied to input terminal 35, that is, irrespective of the operating condition of the network, when a positive pulse is applied to input terminal 41, transistor 30 is biased beyond cut-off and is thereby rendered non-conducting. Because of this and as will be recognized by those skilled in this art, transistor 31 is thereby also in a non-conducting condition, with the result that junction 16 is at a negative voltage level and junction 21 is clamped to ground. In other words, in response to a pulse at input terminal 41, junction point 21 is clamped to ground. Of course, if it was already at ground, it merely remains there.

Finally, it should be mentioned that by reversing the polarities of voltage sources $-V_2$ and $-V_3$, reversing the connections of diode 40 so that the cathode is connected to input terminal 41 and the anode connected to resistor 38, and substituting NPN transistors for PNP transistors 30 and 31, an inhibit-type circuit may also be coupled to the switching circuit of FIG. 4 and used in the manner described. Since similar reversals and substitutions were illustrated (FIG. 4) and described before, it is not deemed necessary to do so again. It should further be mentioned that a primary advantage of the inhibit type circuit shown and described is that of its low power consumption when the inhibit function is in force. In other words, it will be remembered that when a pulse is applied to terminal 41, transistor 10 is switched to an ON state while transistor 11 is switched to an OFF state. Consequently, during an inhibit operation, resistors 22 and 23 are connected to ground so that no current flows in the loop thusly formed by them and no power loss is sustained.

Having thus described the invention, what is claimed as new is:

1. A switching circuit normally producing a first output voltage level corresponding to a first voltage source and operable in response to a signal applied thereto to produce a second output voltage level corresponding to a second voltage source, said circuit comprising; first and second transistors connected in series and connected directly between the first and second voltage sources; a resistive output impedance across which the first and second output voltage levels are produced, said output impedance being connected at one end directly to the first voltage source and at the other end said impedance is selectively connected through said first and second transistors directly to the second voltage source; and variable biasing means connected directly to said first and second transistors for normally biasing said first and second transistors to be conducting and non-conducting, respectively, and operable in response to the applied signal to bias said first and second transistors to be non-conducting and conducting, respectively, said variable biasing means including third and fourth voltage sources and a four-resistor voltage-divider network connected directly between said third and fourth voltage sources, the junction of a first pair of said resistors being connected directly to said first transistor, the junction of a second pair of said resistors being connected directly to said second transistor, and the junction of a third pair of said resistors being connected to directly receive the signal applied to the switching circuit.

2. The switching circuit defined in claim 1 wherein said first and second transistors are respectively NPN and PNP transistors the junction of said first and second pairs of resistors respectively being connected directly to the base elements of said NPN and PNP transistors.

3. The switching circuit defined in claim 1 wherein said first and second transistors are respectively PNP and NPN transistors the junction of said first and second pairs of resistors respectively being connected directly to the base elements of said PNP and NPN transistors.

4. A switching circuit normally producing a first output voltage level corresponding to a first voltage source and operable in response to a signal applied thereto to produce a second output voltage level corresponding to a second voltage source, said circuit comprising: a resistive output impedance including at least one resistor across which the first and second output voltage levels are produced; a NPN transistor whose collector and emitter elements are respectively connected directly to said impedance and the first voltage source; a PNP transistor whose collector and emitter elements are respectively connected directly to said impedance and the second voltage source; and a voltage divider arrangement normally biasing said NPN and PNP transistors to be conducting and non-conducting, respectively, and operable in response to the applied signal to bias said NPN and PNP transistors to be non-conducting and conducting, respectively, said voltage divider including first, second, third and fourth resistors connected in series, the junction of said first and second resistors being connected directly to the base element of said NPN transistor, the junction of said third and fourth resistors being connected directly to the base element of said PNP transistor, and the junction of said second and third resistors being connected to directly receive the applied signal.

5. A switching circuit normally producing a first output voltage level corresponding to a first voltage source and operable in response to a signal applied thereto to produce a second output voltage level corresponding to a second voltage source, said circuit comprising: a resistive output impedance including at least one resistor across which the first and second output voltage levels are produced; a NPN transistor whose collector and emitter elements are respectively connected directly to said impedance and the first voltage source; a PNP transistor whose collector and emitter elements are respectively connected directly to said impedance and the second voltage source; and a voltage divider arrangement normally biasing said NPN and PNP transistors to be conducting and non-conducting, respectively, and operable in response to the applied signal to bias said PNP and NPN transistors to be non-conducting and conducting, respectively, said voltage divider including first, second, third and fourth resistors connected in series, the junction of said first and second resistors being connected directly to the base element of said NPN transistor, the junction of said third and fourth resistors being connected directly to the base element of said PNP transistor, and the junction of said second and third resistors being connected to directly receive the applied signal.

6. A digital-to-analog converter connected between first and second voltage sources for producing an analog voltage equivalent of pulses applied thereto, said converter comprising: a load resistor across which the analog voltage is produced; a plurality of weighting resistors connected at one of their ends directly to said load resistor; and a corresponding plurality of switching circuits respectively connected directly to the other ends of said weighting resistors, each of said switching circuit normally producing a first voltage level corresponding to the first voltage source across its associated weighting resistor and operable in response to a pulse applied thereto to produce a second voltage level thereacross corresponding to the second voltage source, each switching circuit including first and second transistors respectively connected directly between the first and second voltage sources and the associated weighting resistor, and variable biasing means connected directly to said first and second transistors, said means normally biasing said first and second transistors to be conducting and non-conducting, respectively; and operable in response to a pulse applied thereto to bias said first and second transistors to be non-conducting and conducting, respectively.

7. The digital-to-analog converter defined in claim 6 wherein the variable biasing means in each of said switching circuits is a voltage divider arrangement connected directly to the base elements of said first and second transistors.

8. A digital-to-analog converter connected between first and second voltage sources for producing an analog voltage equivalent of pulses applied thereto, said converter comprising: a load resistor across which the analog voltage is produced; a plurality of weighting resistors connected at one of their ends directly to said load resistor; and a corresponding plurality of switching circuits respectively connected to the other ends of said weighting resistors, each of said switching circuits normally producing a first voltage level corresponding to the first voltage source across its associated weighting resistor and operable in response to a pulse applied thereto to produce a second voltage level thereacross corresponding to the second voltage source, each switching circuit including a NPN transistor whose collector and emitter elements are respectively connected directly to said associated weighting resistor and the first voltage source, a PNP transistor whose collector and emitter elements are respectively connected directly to said associated weighting resistor and the second voltage source, and means connected directly to the base elements of said NPN and PNP transistors for biasing said transistors, said means normally biasing said NPN and PNP transistors to be conducting and non-conducting, respectively, and operable in response to a pulse applied thereto to bias said NPN and PNP transistors to be non-conducting and conducting, respectively.

9. The digital-to-analog converter defined in claim 8 wherein the means in each of said switching circuits is a voltage divider arrangement including first, second, third and fourth resistors connected in series, the junction of said first and second resistors being connected directly to the base element of said NPN transistor, the junction of said third and fourth resistors being connected directly to the base element of said PNP transistor, and the junction of said second and third resistors being connected to directly receive the applied pulse.

10. A digital-to-analog converter connected between first and second voltage sources for producing an analog voltage equivalent of pulses applied thereto, said converter comprising: a load resistor across which the analog voltage is produced; a plurality of weighting resistors connected at one of their ends to said load resistor; and a corresponding plurality of switching circuits respectively connected to the other ends of said weighting resistors, each of said switching circuits normally producing a first voltage level corresponding to the first voltage source across its associated weighting resistor and operable in response to a pulse applied thereto to produce a second voltage level thereacross corresponding to the second voltage source, each switching circuit including a PNP transistor whose collector and emitter elements are respectively connected directly to said associated weighting resistor and the first voltage source, a NPN transistor whose collector and emitter elements are respectively connected directly to said associated weighting resistor and the second voltage source, and means connected directly to the base elements of said PNP and NPN transistors for biasing said transistors, said means normally biasing said PNP and NPN transistors to be conducting and non-conducting, respectively, and operable in response to a pulse applied thereto to bias said PNP and NPN transistors to be non-conducting and conducting, respectively.

11. The digital-to-analog converter defined in claim 10 wherein the means in each of said switching circuits is a voltage divider arrangement including first, second, third and fourth resistors connected in series, the junction of said first and second resistors being connected directly to the base element of said PNP transistor, the junction of said third and fourth resistors being connected directly to the base element of said NPN transistor, and the junction of said second and third resistors being connected directly to receive the applied pulse.

12. A switching circuit normally producing a first output voltage level corresponding to a first voltage source and operable in response to a first signal applied thereto to produce a second output voltage level corresponding to a second voltage source, said circuit being operable in response to a second signal applied thereto to return said circuit to its normal state of producing said first output voltage level, said circuit comprising: an input circuit normally producing a first biasing voltage and operable in response to the first signal to produce a second biasing voltage, said input circuit being returned to its normal state of producing said first biasing voltage in response to the second signal; a resistive output impedance across which the first and second output voltage levels are produced; first and second transistors respectively connected directly between the first and second voltage sources and said impedance; and biasing means connected directly between said input circuit and said first and second transistors, said biasing means being operable in response to said first biasing voltage to bias said first and second transistors to be conducting and non-conducting, respectively, and operable in response to said second biasing voltage to bias said first and second transistors to be non-conducting and conducting, respectively.

13. A switching circuit normally producing a first output voltage level corresponding to a first voltage source and operable in response to a signal applied thereto to produce a second output voltage level corresponding to a second voltage source, said circuit comprising; an output load resistor across which the first and second output voltage levels are produced, one end of said load resistor being connected directly to the second voltage source; a NPN transistor whose collector and emitter elements are respectively connected directly to the other end of said load resistor and to the first voltage source; a PNP transistor whose collector and emitter elements are respectively connected directly to the other end of said load resistor and to the second voltage source; and a four-resistor voltage-divider network, the junctions of first and second pairs of said resistors respectively being connected to the base elements of said NPN and PNP transistors and the junction of a third pair of resistors being connected to directly receive the signal applied to the switching circuit, said third pair of resistors being between said first and second pairs of resistors.

14. A switching circuit normally producing a first output voltage level corresponding to a first voltage source and operable in response to a signal applied thereto to produce a second output voltage level corresponding to a second voltage source, said circuit comprising; an output load resistor across which the first and second output voltage levels are produced, one end of said load resistor being connected directly to the second voltage source; a PNP transistor whose collector and emitter elements are respectively connected directly to the other end of said load resistor and to the first voltage source; a NPN transistor whose collector and emitter elements are respectively connected directly to the other end of said load resistor and to the second voltage source; and a four-resistor voltage-divider network, the junctions of first and second pairs of said resistors respectively being connected directly to the base elements of said PNP and NPN transistors and the junction of a third pair of resistors being connected to directly receive the signal applied to the switching circuit, said third pair of resistors being between said first and second pairs of resistors.

References Cited in the file of this patent

UNITED STATES PATENTS

| | | |
|---|---|---|
| 2,956,272 | Cobler | Oct. 11, 1960 |
| 2,976,527 | Smith | Mar. 21, 1961 |
| 2,986,655 | Wiseman et al. | May 30, 1961 |
| 2,992,409 | Lawrence | July 11, 1961 |
| 2,997,606 | Hamburger et al. | Aug. 22, 1961 |
| 3,053,997 | Cobbold | Sept. 11, 1962 |

OTHER REFERENCES

Publication: I.B.M. Technical Disclosure Bulletin Exclusive "OR" circuit, R. G. Greenhalgh, vol. 2, No. 6. April 1960.

Susskind: Analog-Digital Conversion Techniques, The Technology Press, MIT, 1957 (pp. 5–43 relied on).